(12) United States Patent
Cho (10) Patent No.: US 8,518,592 B2
(45) Date of Patent: Aug. 27, 2013

(54) FUEL CELL SYSTEM

(75) Inventor: Woong-Ho Cho, Suwon-si (KR)

(73) Assignee: Samsung SDI Co., Ltd., Giheung-gu, Yongin-si, Gyeonggi-do (KR)

(*) Notice: Subject to any disclaimer, the term of this patent is extended or adjusted under 35 U.S.C. 154(b) by 870 days.

(21) Appl. No.: 12/656,335

(22) Filed: Jan. 26, 2010

(65) Prior Publication Data

US 2011/0027680 A1 Feb. 3, 2011

(30) Foreign Application Priority Data

Jul. 29, 2009 (KR) .................. 10-2009-0069430

(51) Int. Cl.
*H01M 8/04* (2006.01)
*G01F 1/26* (2006.01)

(52) U.S. Cl.
USPC .................................. 429/442; 73/861.74

(58) Field of Classification Search
USPC ............. 429/26, 22, 428; 73/861.74
See application file for complete search history.

(56) References Cited

U.S. PATENT DOCUMENTS

| 2004/0142221 A1 | 7/2004 | Kawamura et al. |
| 2007/0099042 A1* | 5/2007 | Tung ............................. 429/22 |
| 2007/0224475 A1* | 9/2007 | Terada ........................ 429/26 |
| 2008/0145728 A1 | 6/2008 | Rainville |
| 2010/0233554 A1* | 9/2010 | Nogi et al. .................. 429/428 |

FOREIGN PATENT DOCUMENTS

| JP | 2005-044654 | 2/2005 |
| JP | 2007-335409 | 12/2007 |

* cited by examiner

*Primary Examiner* — Jewel V Thompson
(74) *Attorney, Agent, or Firm* — Robert E. Bushnell, Esq.

(57) ABSTRACT

There is provided a fuel cell system capable of improving the performance and operational stability of the fuel cell system by measuring the exact amount of flow of an oxidizer that is supplied to the fuel cell system. The fuel cell system includes a stack for generating electricity by an electrochemical reaction of a fuel and an oxidizer, an oxidizer supply device for supplying an oxidizer to the stack. A volume flow meter coupled to the oxidizer supply device. The volume flow meter measures a volume flow the oxidizer.

19 Claims, 8 Drawing Sheets

FUEL CELL SYSTEM

CLAIM OF PRIORITY

This application makes reference to, incorporates the same herein, and claims all benefits accruing under 35 U.S.C. §119 from an application earlier filed in the Korean Intellectual Property Office on 29 Jul. 2009 and there duly assigned Serial No. 10-2009-0069430.

BACKGROUND OF THE INVENTION

1. Field of the Invention

An aspect of the present invention relates to a fuel cell system capable of improving performance and operational stability thereof.

2. Description of the Related Art

A fuel cell is one of power generation systems for directly converting chemical energy into electric energy by means of an electrochemical reaction of a fuel and an oxidizer. The fuel cell is a next-generation clean power generation system with high efficiency and high power density, using catalysts, electrolytes, electrodes, bipolar plates, packaging, output control balance of plant (BOP) and various fuel reforming techniques. As depletion of resource, environmental pollution and the like have recently been raised as issues in the world, the importance of fuel cells is increasingly emphasized.

The performance of a fuel cell can be improved by actively controlling the flow of a fuel supplied to an anode, an oxidizer supplied to a cathode, a reactant produced by an electrochemical reaction of the fuel and the oxidizer, and the like.

SUMMARY OF THE INVENTION

Accordingly, there is provided a fuel cell system that improves the performance and operational stability thereof by measuring the exact flow of an oxidizer used in the fuel cell system.

According to an aspect of the present invention, there is provided a fuel cell system including a stack for generating electricity by an electrochemical reaction of a fuel and an oxidizer; an oxidizer supply device for supplying an oxidizer to the stack; and a volume flow meter coupled to the oxidizer supply device. The volume flow meter measures the volume flow of the oxidizer. The volume flow meter is driven by power supplied from the oxygen supply device.

The volume flow meter may include an impeller. The volume flow meter may include a body having an inner space and first and second openings connected to the inner space; a fixed shaft disposed in the inner space and an end of which is fixedly coupled to an inner groove formed on the body; a rotating member disposed in the inner space; a bearing for coupling the fixed shaft to the rotating shaft; and a sensor for measuring a rotational frequency of the rotating member. The rotating member includes a rotating shaft rotatably coupled to the fixed shaft; and a plurality of plate-shaped wings connected to the rotating shaft.

The bearing may be positioned around a center of mass of the rotating member. The rotating member may include an auxiliary rim arranged between two of the plate-shaped wings. A length of a lateral edge of the auxiliary rim may be substantially the same as a length of a lateral edge of the plate-shaped wings. The lateral edge of the auxiliary rim may be parallel with the lateral edges of the plate-shaped wings.

A cross-section of the auxiliary rim is formed in an arc shape. The auxiliary rim may be formed in a plate shape, and connects an end lateral edge of one of the plate-shaped wings to a side of another of the plate-shaped wings. The auxiliary rim may be formed in a plate shape, and connects a side of one of the plate-shaped wings to a side of another of the plate-shaped wings.

The first and second openings may be arranged along a straight line. A diameter of each of the first and second openings may be about 2.0 mm to about 20.0 mm. A rating capacity of the volume flow meter may be about 10 LPM to about 200 LPM.

The sensor may include a photo sensor. The photo sensor may be a transmission-type photo sensor. The volume flow meter may be provided in the vicinity of an inlet of the oxidizer supply device. The fuel cell system may be coupled to an inlet of the oxidizer supply device, through which the oxidizer flows into the oxidizer supply device. The fuel cell system may further include a temperature measuring device coupled to the inlet of the oxidizer supply device, a pressure measuring device coupled to the inlet of the oxidizer supply device, and an oxygen concentration measuring device coupled to the inlet of the oxidizer supply device. The oxygen concentration measuring device measures the concentration of oxygen contained in air.

The fuel cell system may further include a temperature measuring device, a pressure measuring device and an oxygen concentration measuring device, coupled to the inlet of the oxidizer supply device; and a controller for controlling operations of the oxidizer supply device based on information sent from the stack, the fuel supply device, the volume flow meter, the temperature measuring device, the pressure measuring device and the oxygen concentration measuring device.

The fuel cell system may further include a fuel supply device for supplying a fuel to the stack; a second oxidizer supply device for supplying an oxidizer to the fuel supply device; and a second volume flow meter for measuring the volume of a fluid per unit area, which passes therethrough by means of power supplied from the another oxidizer supply device.

According to an embodiment of the present invention, the exact flow of an oxidizer can be supplied to a fuel cell stack or a combustor of a fuel supply device (e.g., a fuel reforming device). Further, the performance and stability of a system can be improved through the supply of the exact flow of the oxidizer. Furthermore, a performance/capacity error is reduced, so that manufacturing cost can be saved, and the miniaturization of the system can be promoted.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals refer to like elements.

Figure 1A:
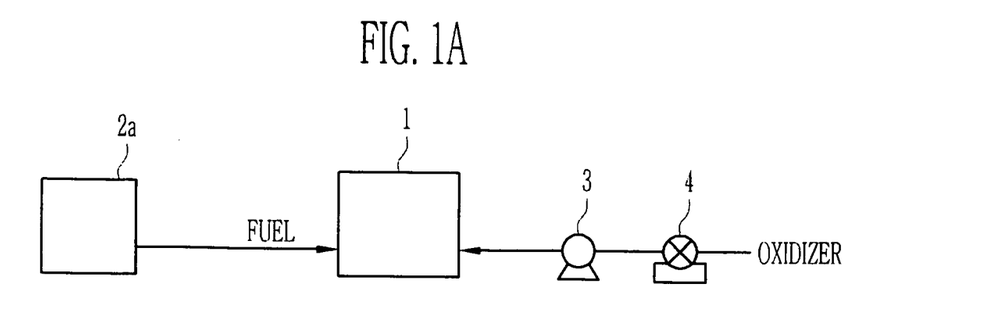
FIG. 1A is a block diagram of a fuel cell system according to an embodiment of the present invention.

FIG. 1A is a block diagram of a fuel cell system according to an embodiment of the present invention. Referring to FIG. 1A, the fuel cell system according to the embodiment of the present invention includes a stack 1 for generating electricity by an electrochemical reaction of a fuel and an oxidizer; a fuel supply device 2a for supplying a fuel to the stack 1; a first oxidizer supply device 3 for supplying an oxidizer to the stack 1; and a first volume flow meter 4 for measuring a volume flow of an oxidizer flowing into the oxidizer supplying device 3. Specifically, the volume flow meter 4 measures an amount of volume passing a unit area per unit time. The volume flow meter 4 is driven by power supplied from the oxidizer supply device 3. The fuel supply device 2a of this embodiment supplies the fuel to an anode of the stack 1. The fuel supply device 2a may include a fuel tank for storing a certain amount of fuel at a certain pressure. For example, the fuel supply device 2a may include a fuel tank for storing hydrogen.

Figure 1B:
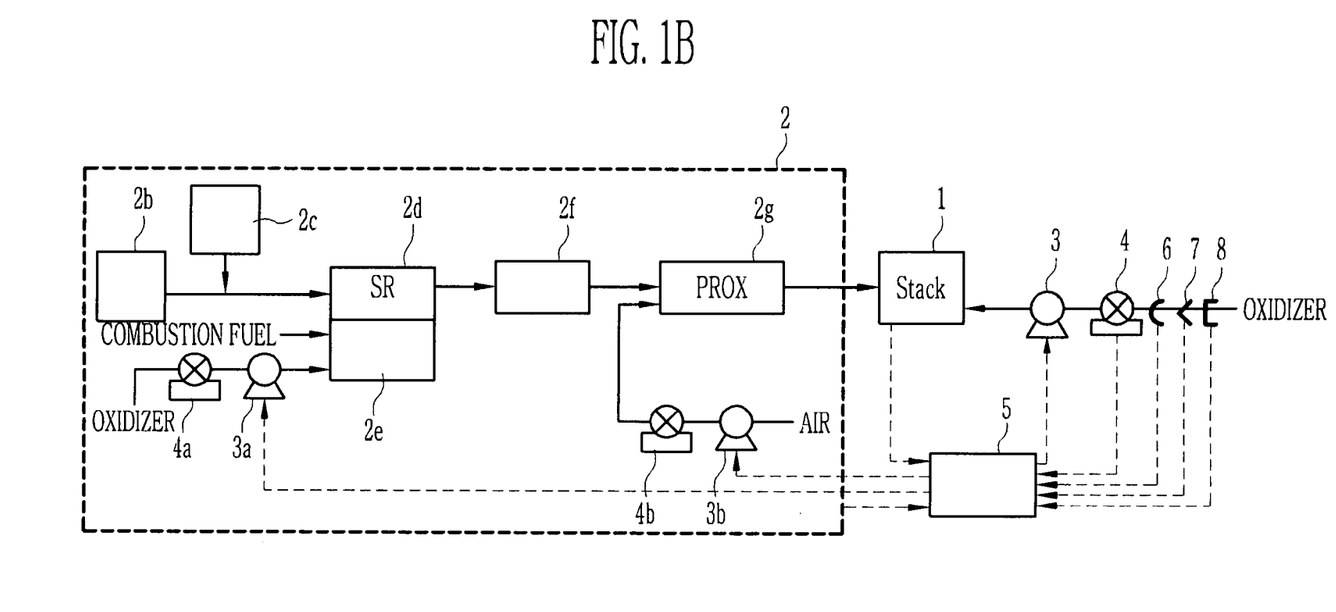
FIG. 1B is a block diagram of a fuel cell system according to another embodiment of the present invention.

FIG. 1B is a block diagram of a fuel cell system according to another embodiment of the present invention. Referring to FIG. 1B, the fuel cell system according to the embodiment of the present invention may include another type of fuel supply device 2 for supplying a fuel to the stack 1. The fuel supply device 2 includes a fuel tank 2b for storing a certain amount of fuel; a water tank 2c for storing water; a steam reforming reactor 2d for performing a steam reforming reaction with the fuel supplied from the fuel tank 2b and the water supplied from the water tank 2c; a combustor 2e for supplying energy (or heat) required in the steam reforming reactor 2d; a water gas shift reactor 2f for shifting carbon monoxide in a reforming gas produced from the steam reforming reactor 2d to hydrogen; a preferential oxidation reactor 2g for reducing carbon monoxide in the reforming gas produced from the water gas shift reactor 2f; a second oxidizer supply device 3a for supplying an oxidizer for oxidizing a combustion fuel supplied to the combustor 2e and a second volume flow meter 4a for measuring a volume flow of a fluid, which passes therethrough, being driven by power supplied from the second oxidizer supply device 3a; and a third oxidizer supply device 3b for supplying air to the preferential oxidation reactor 2g and a third volume flow meter 4b for measuring a volume flow of a fluid, which passes therethrough, being driven by power supplied from the oxidizer supply device 3b.

In this embodiment, the fuel cell system may further include at least one of a temperature measuring device 6, a pressure measuring device 7 and an oxygen concentration measuring device 8. The fuel cell system may further include a controller 5 for controlling operations of the first oxidizer supply device 3 based on information sent from the stack 1, the fuel supply device 2, the temperature measuring device 6, the pressure measuring device 7 and the oxygen concentration measuring device 8. The temperature measuring device 6, the pressure measuring device 7 and the oxygen concentration measuring device 8 may be additionally provided in the vicinity of an inlet of the second or third oxidizer supply device 3a or 3b. In this case, the controller 5 receives information sent from the devices 6, 7 and 8 to control operations of the oxidizer supply devices 3a and 3b. Hereinafter, the fuel cell system illustrated in FIG. 1B will be described in detail.

The stack 1 may have a structure in which at least one electric generator as a basic unit is stacked in multiple layers with a bipolar plate interposed therebetween. The electric generator may include an anode and a cathode. The electric generator generates electricity by an electrochemical reaction of a fuel and an oxidizer. The detailed configuration, material and operational principle of the stack 1 are already known by those skilled in the art. Therefore, their descriptions will be omitted. The present invention may employ a stack already known before the present invention.

The fuel supply device 2 is a device for supplying a fuel to an anode of the stack 1. The fuel may include combustible hydrogen carbide having hydrogen or hydrogen atom, reacted directly to an oxidizer. Like a direct methanol fuel cell, when hydrogen ions are directly generated in a stack, the fuel may include methanol and water.

The fuel supply device 2 reforms a raw material such as a natural gas, and supplies oxygen. The fuel supply device 2 may include a reformer and a raw material storage device. The reformer may include a steam reforming device for steam reforming a fuel to generate a reformate. The raw material storage device may include a fuel tank 2b and a water tank 2c.

The reformer is a device for converting a raw material such as a natural gas into hydrogen by using a catalyst and the like. The detailed configuration, material and operational principle of the reformer are already known by those skilled in the art. Therefore, their descriptions will be omitted.

The first oxidizer supply device 3 is a device for supplying an oxidizer to the stack 1 or the fuel supply device 2.

An oxidizer refers to a substance that oxidizes another substance while it is reduced. In this embodiment, the oxidizer includes air containing oxygen in the atmosphere.

The oxidizer supply device 3 is a device for supplying air in the atmosphere to a cathode of the stack 1. The oxidizer supply device 3 includes a typical air pump for pressure-feeding air. In the measurements shown in FIGS. 8A, 8B and 9, an air pump was used for an oxidizer supply device.

Oxygen in the air flows into the cathode of the stack 1 and reacts with hydrogen ions moved from the anode of the stack 1, thereby generating water. The flow of an oxidizer (e.g., oxygen contained in the air) supplied to the cathode of the stack 1 may be controlled for various purposes. The flow of the oxidizer may be controlled depending on the amount of oxygen supplied to the anode of stack 1 or may be controlled depending on the temperature in the stack 1 so as to maintain the performance and durability of the stack 1.

In the combustor 2e connected to the fuel supply device 2, heat is generated by reacting a raw material such as a natural gas with oxygen in the air. The generated heat may be supplied as energy required in the fuel supply device 2. The flow of an oxidizer (e.g., oxygen contained in the air) supplied to the combustor 2e may be controlled depending on the amount of fuel supplied to the combustor 2e or may be controlled by measuring the temperature at the vicinity of a fuel inlet of the combustor 2e, depending on the energy required in the steam reforming reactor 2d.

In the fuel cell system of this embodiment, it is important not only to supply an exact amount of fuel but also to supply an exact amount of air containing oxygen that reacts with the fuel.

The flow of air may be controlled by a method that controls an inflow of air by using a mass flow meter or by a method of simply controlling power of an air pump to control the inflow of air.

However, in the method that uses a mass flow meter, manufacturing cost is expensive, and the volume of the device is increased. Further, the supply pressure of air is greatly increased due to the pressure drop generated in the mass flow meter. In the method that controls power of an air pump, as the exact flow of air is not measured and the air pump deteriorates, the performance of the system is degraded.

If a general volume flow meter is simply used in the fuel cell system, due to the aforementioned problems, potential problems are as follows.

First, a turbine flow meter as a kind of volume flow meter necessarily has magnetized wings. Therefore, the wings may be formed of a magnetic material, or a magnetic material may be attached to the wings. However, a material formed of a conductor is used as the magnetic material, and therefore, the wings are formed of a heavy material. Further, the wings formed of a heavy material cause a large error range in measuring the flow of a gaseous fluid due to the inertial force. In the turbine flow meter, a pickup coil sensor is necessarily used to measure the rotational frequencies of magnetic wings. However, if a gaseous fluid is measured using the sensor, its accuracy is lowered.

Second, a volume flow meter having a rotating member with wings fixed to a rotating shaft may be considered. However, in the volume flow meter, an end of the rotating member is necessarily inserted into a groove formed in a body together with a bearing. In the volume flow meter, the inertial force of the rotating member is increased due to the weight of the bearing and the like. Therefore, the error range of rotational frequencies is increased.

Further, when the volume flow meter has a large difference between the inner space of the body and the space occupied by the rotating member while rotating, a fluid is irregularly moved in the inner space of the volume flow meter. Therefore, the error range of rotational frequencies is increased.

Accordingly, in this embodiment, the volume flow meter 4 having an improved structure is provided to control the exact flow of a gaseous oxidizer (e.g., air) used in the fuel cell system. In the fuel cell system of this embodiment, a device for measuring an atmosphere around the volume flow meter 4 (e.g., a temperature measuring device, a pressure measuring device or an oxygen concentration measuring device) may be additionally used.

After passing through a steam reforming reaction, the reformer may be prepared to pass through a water gas shift reaction for lowering the concentration of carbon monoxide and then pass through a preferential oxidation reaction for lowering the concentration of carbon monoxide to 10 ppm or less. In the preferential oxidation reaction, oxidation is performed by injecting a small amount of air. Therefore, the third volume flow meter 4a of FIG. 1B may be used in this embodiment. In FIG. 1B, the second and third volume flow meters 4a and 4b are substantially identical to the first volume flow meter 4.

The volume flow meter 4 is a device for measuring a volume flow of a fluid, which passes therethrough. The volume flow meter 4 may be driven by power supplied from the oxidizer supply device 3. Here, the term "fluid" is commonly used to refer to liquid or gas. The fluid refers to a substance with no shape of its own and a property in which it is moved when a force is applied and would not restored to its original condition even though the force is removed. The flow refers to a ratio of the volume or mass of a fluid passing through a period of time. The ratio of the volume of a fluid passing through a period time is referred to as a volume flow ($m^3/s$), and the ratio of the mass of a fluid to time is referred to as a mass flow (kg/s).

The volume flow meter 4 of this embodiment measures the volume flow of a fluid. Oxidizers, most of which are in a gaseous phase, may be considered as fluids.

In this embodiment, the volume flow meter 4 includes an impeller-type volume flow meter. The impeller-type volume flow meter is a volume flow meter having an impeller, and the impeller is used to measure a volume flow of a fluid. The impeller refers to a rotating member having wings (or blades) radially formed at an equal interval along a rotating shaft. The rotation of the wings is driven by a flow of a fluid flowing into the rotating member. therein. In this embodiment, the impeller is not defined by the shape of wings but defined by the shape radially formed at a regular interval from the rotating shaft, regardless that the shape of wings are plan or elliptical.

The impeller-type volume flow meter of this embodiment is a device for measuring a flow of a fluid flowing into the device by detecting a rotational frequency of a rotating member. Specifically, embodiments of the shape of wings in the impeller-type volume flow meter will be illustrated in FIGS. 4 to 7.

The material of the volume flow meter 4 includes a highly functional plastic. Plastics are generally classified into a thermoplastic resin and a thermosetting resin. Thermoplastic resins are classified into a general resin and an engineering plastic (hereinafter, referred to as 'EP'). EPs are classified into a general EP and a super EP. General EPs are classified into polyamide (PA), polyoxymethylene (POM), polycarbonate (PC), modified polyphenylene oxide (MPPO), polybutylene terephthalate (PBT) and the like. Super EPs are classified into polyimide (PI), polysulfone (PSF), polyphenylene sulfide (PPS), polyamide imide (PAI), polyacrylate (PAR), polyether sulfone (PES), polyether ether ketone (PEEK), polyether imide (PEI), liquid crystal polymers (LCP), polyether ketone (PEK) and the like.

In this embodiment, a body 11 may be formed using a transparent PC out of these general EPs, and wings 17 may be formed using a POM out of these general EPs.

In view of properties of the EP, the PC and POM used in embodiments of the present invention are highly functional materials superior to general resins in tensile strength, flexural modulus, thermal resistance, flame resistance and the like. That is, the PC and POM are excellent durable materials, properties of which are not easily changed by external experimental factors. Further, the PC and POM are ultralight materials having a low weight.

As described above, an ultralight plastic having excellent durability against external factors is used as a material of the body and wings, so that it is possible to measure the exact flow of a fluid in a small error range.

The temperature measuring device 6 and the pressure measuring device 7 are provided in the vicinity of the inlet of the oxidizer supply device 3. The data of temperature and pressure, respectively measured by the temperature measuring device 6 and the pressure measuring device 7, are sent to the controller 5, and processed based on reference data previously inputted. The temperature measuring device 6 and the pressure measuring device 7 may be provided between the oxidizer supply device 3 and the volume flow meter 4.

The oxygen concentration measuring device 8 is a device for measuring the concentration of oxygen contained in the air and functions to supply an exact concentration of oxygen. The oxygen concentration measuring device 8 is provided in the vicinity of an inlet of the volume flow meter 4. This is for the purpose of measuring the exact concentration of oxygen in the air flowed into the volume flow meter 4.

As auxiliary devices for measuring the exact flow of a fluid, a drying device (not shown), an air filter and the like may be provided in the vicinity of the volume flow meter 4. When a large amount of moisture is contained in the air, it is difficult to supply the exact flow of a fluid due to the moisture. For this reason, the drying device may be provided. When a large number of foreign matters are contained in the air, it is difficult to supply the exact flow of a fluid due to the foreign matters. For this reason, the air filter may be provided.

The controller 5 receives information sent from the stack 1, the fuel supply device 2, the volume flow meter 4, the temperature measuring device 6, the pressure measuring device 7 and the oxygen concentration measuring device 8 so as to control the oxidizer supply device 3.

Data on the volume flow meter 4 to be used are previously inputted to the controller 5. The flow of the fluid supplied by the oxidizer supply device 3 is controlled by arithmetically processing newly inputted information, based on the previously inputted data. In other words, the controller 5 has data about a supply amount of oxygen required in the stack 1 or the fuel supply apparatus 2. The controller 5 controls the oxidizer supply device 3 based on the required supply amount of oxygen by processing the data received from the volume flow meter 4. At this time, the controller 5 may control the oxidizer supply device 3 based on the result obtained by processing the information received from the temperature measuring device 6, the pressure measuring device 7 and the oxygen concentration measuring device 8 together with the data received from the volume flow meter 4. The controller 5 may be implemented as a logic circuit using a flip flop, a microprocessor or the like.

Figure 2:
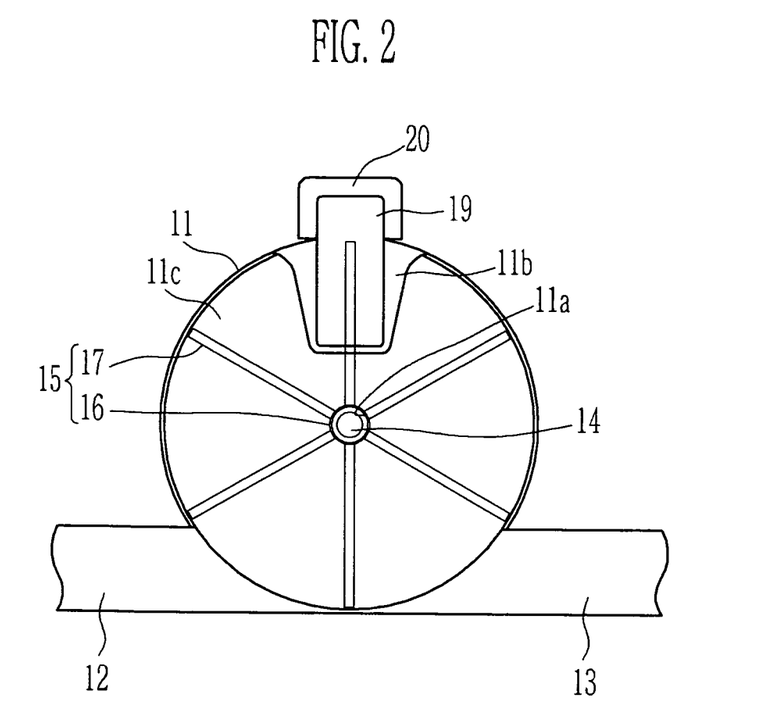
FIG. 2 is a schematic sectional view of a flow meter according to an embodiment of the present invention.
Figure 3:
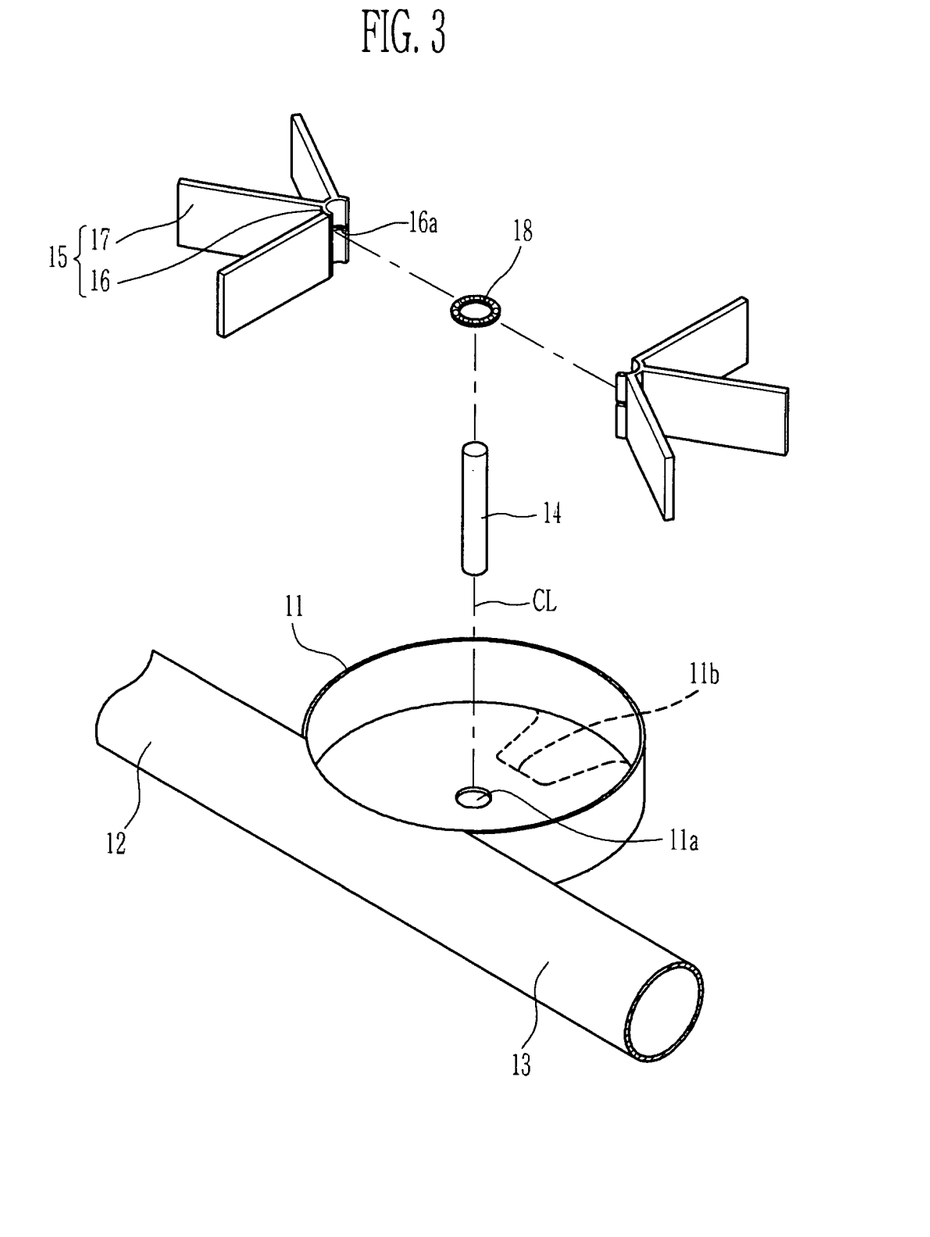
FIG. 3 is an exploded perspective view of the flow meter according to the embodiment of the present invention.

FIGS. 2 and 3 are schematic sectional and exploded perspective views of a flow meter according to an embodiment of the present invention. Referring to FIGS. 2 and 3, the impeller-type volume flow meter according to the embodiment of the present invention includes a body 11 having an inner space 11*c*, and first and second openings 12 and 13 connected to the inner space 11*c*; a fixed shaft 14 having both ends fixedly inserted into inner grooves 11*a* of the body 11; a rotating member 15 including a rotating shaft 16 rotatably coupled to the fixed shaft 14 and rectangular plate-shaped wings 17 connected to the rotating shaft 16; a bearing 18 coupling the fixed shaft 14 to the rotating shaft 16 to make the rotating member 15 smoothly rotate; a sensor 19 for measuring rotational frequency of the rotating member 15; and a protective cover 20 for covering the sensor 19. The wings 17 are radially separated from each other with the same interval along the rotating shaft 16.

The interior of the body 11 is provided with the inner space 11*c* in which the rotating member 15 is disposed and rotates. The body 11 has inner grooves 11*a* to which both ends of the fixed shaft 14 are fixedly coupled.

The shape of the inner space 11*c* of the body 11 is determined depending on the shape of the wings 17 of the rotating member 15. When the shape of the wings 17 is a rectangular plate shape as illustrated in FIG. 3, the inner space 11*c* of the body 11 has a cylindrical shape, which is matched to the shape formed while the rectangular plate-shaped wings 17 rotates. Therefore, the body 11 having a cylindrical shape has two bases and a curved wall formed between the two bases. Herein, inner surfaces of the curved wall and bases are referred to surfaces thereof that face the inner space 11*c*. The passages from the first and second openings 12 and 13 have a cylindrical shape, through which the first and second openings 12 and 13 are respectively connected to one end of the inner space 11*c*.

Figure 4:
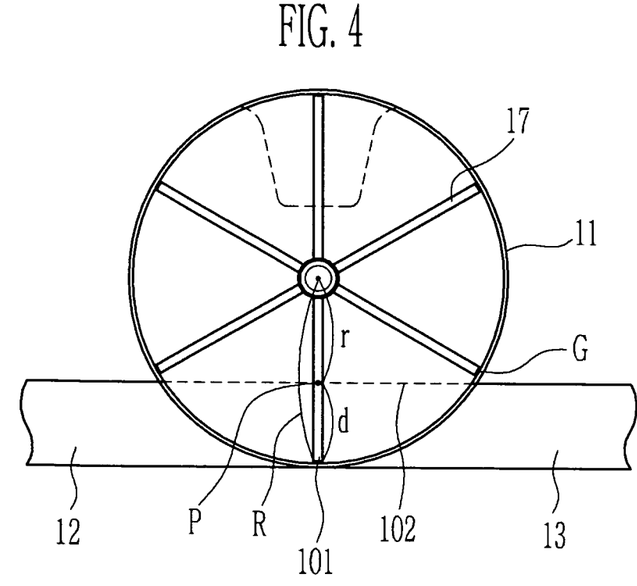
FIG. 4 is a sectional view of a flow meter employing basic wings according to an embodiment of the present invention.

The inner space 11*c* has the size of a minimum space in which the rotating member 15 is capable to rotate. Referring to FIG. 4, the reference character G refers to a gap between an inner surface of a curved wall of the body 11, which encloses the inner space 11*c*, and outer edge of the wings 17. In other words, the gap G is the value obtained by subtracting the circular radius R of the cylinder, which is formed while the rotating member 15 rotates from a circular radius (not marked) of the inner space 11*c* of the cylindrical body 11. The size of the gap G is a minimum value at which the rotating member 15 can rotate smoothly in the inner space 11*c* of the body 11. The reason for maintaining the minimum gap G is that an error increases if a fluid irregularly leaks through the gap.

Referring back to FIGS. 2 and 3, an imaginary line, which is parallel to the rotating shaft 16 and the fixed shaft 14, and is passing through the center of the fixed shaft 14 is referred to as a center line CL. The inner grooves 11*a* are formed on the bases of the cylindrical body 11, and are positioned aligned to the center line CL. Therefore, the center line CL is a center of a circle, which is formed while the rotating member 15 rotates.

The shape of the inner grooves 11*a* is determined depending on the shape of the ends of the fixed shaft 14. Various known embodiments may be applied to the connection of the inner grooves 11*a* and the fixed shaft 14. For example, in an embodiment, the end of the fixed shaft 14 may be fixedly inserted into the inner groove 11*a* by using a rubber ring interposed between the inner groove 11*a* and the end of the fixed shaft 14. In another embodiment, one inner groove 11*a* may be formed, and the fixed shaft 14 may be injection molded while being fixedly inserted into the other groove 11*a*.

An outer groove 11*b* is provided on the exterior of the body 11. The sensor 19 for measuring rotational frequencies of the wings 17 of the rotating member 15 is inserted into the outer groove 11*b*. The size and shape of the outer groove 11*b* are determined depending on those of the sensor 19. The body 11 is formed of a transparent, highly functional plastic so that the sensor attached to the body 11 measures rotational frequencies of the wings 17 and so that the operation of the rotating member 15 is observed from the outside.

A protective cover 20 for protecting the sensor 19 may be mounted on an outer portion of the body 11. The protective cover 20 allows the sensor 19 to be safely combined with the body 11 and prevents foreign matters from being penetrated into or stuck to the sensor 19.

The diameters of the first and second openings 12 and 13 are substantially the same, and passages from the first and second openings 12 and 13 are disposed on a straight line to be connected together. Specifically, an oxidizer supply path is connected not only to the first and second openings 12 and 13 but also to an inlet (not shown) and an outlet (not shown) of the oxidizer supply device 3. The diameters of inlet and outlet of the oxidizer supply device 3 have substantially the same as the diameters of the first and second openings 12 and 13. If the first and second openings 12 and 13 and the inlet and outlet of the oxidizer supply device 3 are disposed on a straight light as described above, it is possible to reduce an error caused by a change in pressure, which may occur while a gaseous fluid flows though passage in a curved shape.

The diameters (or calibers) of the first and second openings 12 and 13 may be about 2.0 to 20.0 mm. In the measurement shown in FIGS. 8A, 8B and 9, an embodiment was implemented by setting the diameter of the first and second openings as 4.5 mm. A flow of a fluid passing through the first and second openings 12 and 13, i.e., the flow passing through the volume flow meter 4, may be about 10 to 100 liter per minute (LPM).

When the flow is below 10 LPM, a vacant space is formed on the flow of the fluid passing through the first and second openings 12 and 13, and therefore, an error range becomes large. When the flow is over 100 LPM, an irregular turbulent flow occurs on the flow of the fluid. In the measurements shown in FIGS. 8A, 8B and 9, embodiments were implemented by setting the flows as 10 LPM, 15 LPM and 20 LPM, respectively. In an embodiment of the present invention, the error range was lowered to less than ±0.3 LPM by setting the diameter of the first and second openings 12 and 13 as 4.5 mm, and by controlling the flow of the fluid passing through the first and second openings 12 and 13 within the aforementioned range (See Tables 1 and 2 and FIGS. 8A, 8B and 9).

The fixed shaft 14 becomes a rotational center axis of the rotating member 15, and both ends of the fixed shaft 14 are fixedly inserted into the inner grooves 11a of the body 11. In this embodiment, the fixed shaft 14 is formed in a cylindrical rod shape, and the shape of the end of the fixed shaft 14 may be varied depending on how the end of the fixed shaft 14 is fixedly inserted into the inner groove 11a of the body 11.

The rotating member 15 includes a rotating shaft 16 rotatably coupled to the fixed shaft 14, and plate-shaped wings 17 connected to the rotating shaft 16. The wings 17 are equally separated from each other at the same angle. In the rotating member 15 of this embodiment, the rotating shaft 16 is integrally formed with the wings 17.

The bearing 18 is a coupling member disposed between the fixed shaft 14 and the rotating shaft 16 so that the rotating member 15 can be smoothly rotated. The bearing 18 is fixedly inserted into the rotational center of the rotating member 15.

In a comparative form, the rotating member 15 may be fixedly inserted into inner grooves 11a of the body 11 and may rotate without a fixed shaft 14. That is, in the comparative form, the rotating member body having wings connected to a rotating shaft is inserted into the inner grooves of the body and is rotated. When using a volume flow meter having a rotating member of this comparative form, it is difficult to measure an exact flow of a fluid, and an error range becomes large, and accordingly in this embodiment, the rotating member 15 is not allowed to be directly coupled to the inner groves 11a. In this embodiment, a fixed shaft 14 is used as a rotational support shaft to be arranged along the center line CL in the body 11, and be directly coupled to the inner grooves 11a. In order to make the rotation of the rotating member 15 smooth, the bearing 18 is inserted between the fixed shaft 14 and the rotating shaft 16.

In the volume flow meter of this embodiment, the fixed shaft 14 is fixedly inserted into an inner ring (not marked) of the bearing 18, and an outer ring (not marked) is fixedly inserted into a bearing insertion groove 16a formed in the rotating shaft 16, so that the rotating member 15 smoothly rotates supported by the bearing 18. As the rotating shaft 16 rotates outside the fixed shaft 14 by the support of the bearing 18 as described above, the diameter of a cylindrical inner space of the rotating shaft 16 is necessarily greater than that of the cylindrical fixed shaft 14.

If one bearing 18 is used to support the rotation of the rotating member 15, the bearing 18 may be positioned around a center of mass of the rotating member 15, as the rotating member 15 necessarily rotates about the center of mass, and an unnecessary vibration of the rotating member 15 during the rotation can be prevented.

If two bearings 18 are installed into the rotating shaft 16, the rotating member 15 may maintain a balance without leaning to any side. Therefore, the bearings 18 may be disposed to maintain optimum balance of the rotating member 15. However, in this embodiment, it is preferable to employ one bearing 18. Referring to Tables 1 and 2 and FIGS. 8A, 8B and 9, it is seen that an error range in the case of one bearing f1 is smaller than that in the case of two bearings f2.

Bearings are generally classified into a rolling bearing and a sliding bearing. Rolling bearings are classified into a ball bearing and a roller bearing. The bearing 18 available in this embodiment may include a ball bearing. The ball bearing typically includes an inner ring, an outer ring, a rolling element and a retainer.

The volume flow meter of this embodiment can reduce the error range of the flow meter 4 by controlling the position and number of bearings 18.

The sensor 19 is a device for measuring a rotational frequency of the rotating member 15. The sensor 19 is inserted into the outer groove 11b of the body 11. The protective cover 20 is disposed outside the sensor 19 so that the sensor 19 is safely connected to the body 11. The protective cover 20 may be formed to extend up to the portion of the sensor 19 inserted into the outer groove 11b of the body 11. The protective cover 20 allows the sensor 19 to measure exact rotational frequencies of the rotating member 15 without vibration. Further, the protective cover 20 prevents foreign matters from being penetrating into the sensor 19, thereby improving accuracy of the sensor 19.

For example, the sensor 19 may be implemented as an optical sensor, an ultrasonic sensor, a pressure sensor, a temperature sensor or the like. In this embodiment, a photo sensor (or photo interrupter), which is a kind of optical sensor, is used as the sensor 19. Photo sensors are generally divided into a transmission type (or gap type) and a reflection type, and a transmission-type photo sensor is employed in this embodiment. The transmission-type photo sensor includes a light emitting element and a light receiving element. In the transmission-type photo sensor, light emitted from the light emitting element is incident into the light receiving element. When a non-transparent object passes between the light emitting element and the light receiving element, light is blocked by the non-transparent object and the light receiving element detects no light, which results in a change in output of the light receiving element. The transmission-type photo sensor measures rotational frequency by sensing the changes in output.

The sensor 19 of this embodiment is a transmission-type photo sensor having a 'U' shape, and is disposed outside the transparent body 11, astride the body 11, to measure rotational frequency of the rotating member 15 based on changes in output caused by the wings 17 of the rotating member 15 blocking light incident from the light emitting element to the light receiving element. The light emitting element includes a light emitting diode (LED), and the light receiving element includes a photo-transistor.

FIGS. 4 to 7 are sectional views illustrating shapes of wings 17 applicable to the volume flow meter 4.

Hereinafter, dimensions and terminologies of the wings will be explained referring to a single wing of the wings 17 shown in FIGS. 4 to 7. In the rectangular plate-shaped wing 17, an edge parallel with the rotating shaft 16 is referred to as a lateral edge of the wing 17, and an edge perpendicular to the rotating shaft 16 is referred to as a longitudinal edge of the wing 17. Among the lateral edges, a lateral edge closer to the rotating shaft is referred to as a base lateral edge, and a lateral edge distant from the rotating shaft, which is an end of the wing, is referred to as an end lateral axis. Among the longitudinal edges, a longitudinal edge, which is directly viewed from the drawings, is referred to as a first longitudinal edge, and another longitudinal edge positioned opposite to the first longitudinal edge is referred to as a second longitudinal edge.

An imaginary line extending parallel to the rotating shaft 16 and passing the center of the rotating shaft 16 is referred to as a center line CL (as shown in FIG. 3). The distance from the center line CL to the end lateral edge of the wing 17 is referred to as a rotational radius R.

When a fluid passes through the first and second openings 12 and 13, a flow of the fluid can be represented by straight pass lines that connect the first opening 12 to the second opening 13. A wing (lower wing) 17, which is positioned substantially perpendicular to the path lines while intercepting the pass lines is referred to as a reference wing 101. The uppermost one of the path lines, which meets the reference wing 101 and is closest to the center line CL, is referred to as a virtual extension line 102.

The point at which the reference wing 101 meets the virtual extension line 102 is referred to as an intersection point P, and the distance from the intersection point P to the end lateral edge of the reference wing 101 is referred to as an intercepting distance 'd'. The distance from the intersection point P to the center line CL is referred to as a non-intercepting distance 'r'.

A gap between the rotational radius R of the wing 17 from the circular radius (not shown) of the inner surface of the curved wall of the cylindrical body 11 is referred to as a gap G. That is, the gap G is a value of an extra space formed between the end lateral edge of the wing 17 and the inner surface of the curved wall of the body 11. Because of the extra space, the wing 17 does not touch the inner surface of the curved wall of the body 11, and the rotation of the wings 17 is not hindered.

FIG. 4 shows rectangular plate-shaped wings 17 included in an impeller type flow meter. The wings of this shape are referred to as basic wings so as to distinguish them from wings in other embodiments shown in FIGS. 5 to 7.

Figure 5:
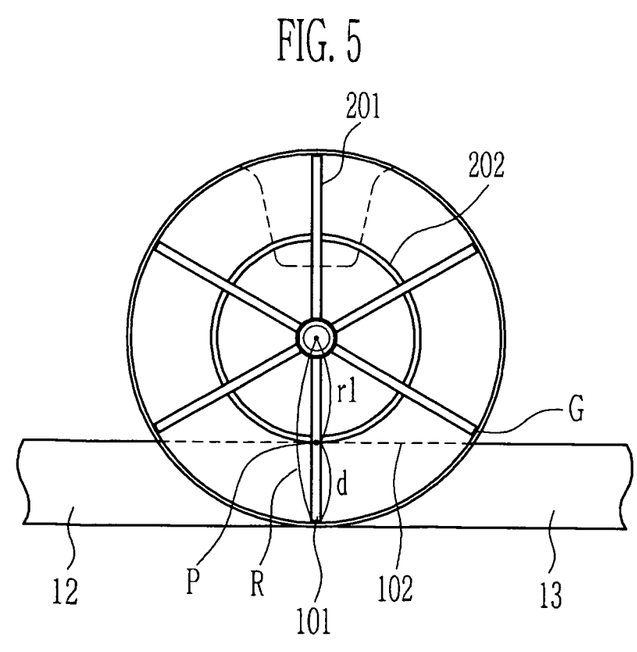
FIG. 5 is a sectional view of a flow meter employing cylindrical wings according to an embodiment of the present invention.

Referring to FIG. 5, the rotating member 15 has an auxiliary rim 202. As shown in FIG. 5, the cross-section of the auxiliary rim 202 has an arc shape (or curved shape). Herein, the cross-section is a surface section cut perpendicular to the center line CL. If the body 11 has a cylinder shape, the cross-section is a surface that is parallel to a base of the cylinder. Each auxiliary rim 202 is formed to extend between two of the basic wings, and connects one of the wings 17 to another of the basic wings. The auxiliary rim 202, having a cross-sectional shape of arc, has a radius smaller than the rotational radius R by the intercepting distance d. All auxiliary rim 202, when they are combined together, look like a cylinder. Wings having this kind of the auxiliary rim 202 are referred to as cylindrical wings 201. Herein, the same definitions as applied to the wing are applied to the terminologies such as a base lateral edge, an end lateral edge, a lateral edge, and a longitudinal edge of the auxiliary rim.

Figure 6:
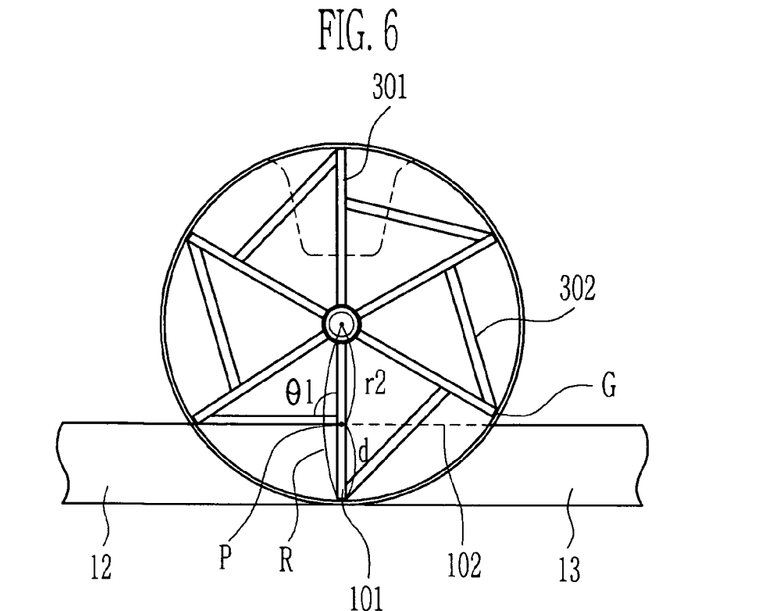
FIG. 6 is a sectional view of a flow meter employing triangular wings according to an embodiment of the present invention.

Referring to FIG. 6, the rotating member 15 includes another type auxiliary rim 302, which has a plate shape. The another auxiliary rim 302 extends from an end lateral edge of one wing to a side of another wing. The side of another wing, at which the auxiliary rim 302 is connected, is positioned between an end lateral edge and a base lateral edge of another wing. Wings having this type of a rectangular plate-shaped rim 302 are referred to as triangular wings 301. Here, the rectangular plate-shaped rim is parallel with the lateral edge of the basic wing, and the lateral edge of the rectangular plate-shaped rim has the same length as that of the lateral edge of the basic wing. Each of the rectangular plate-shaped rims is referred to as a triangular auxiliary rim 302. Here, the triangular auxiliary rims 302 are formed to extend between two of the basic wings, and the lengths of the lateral edges of the triangular auxiliary rims 302 are the same.

Figure 7:
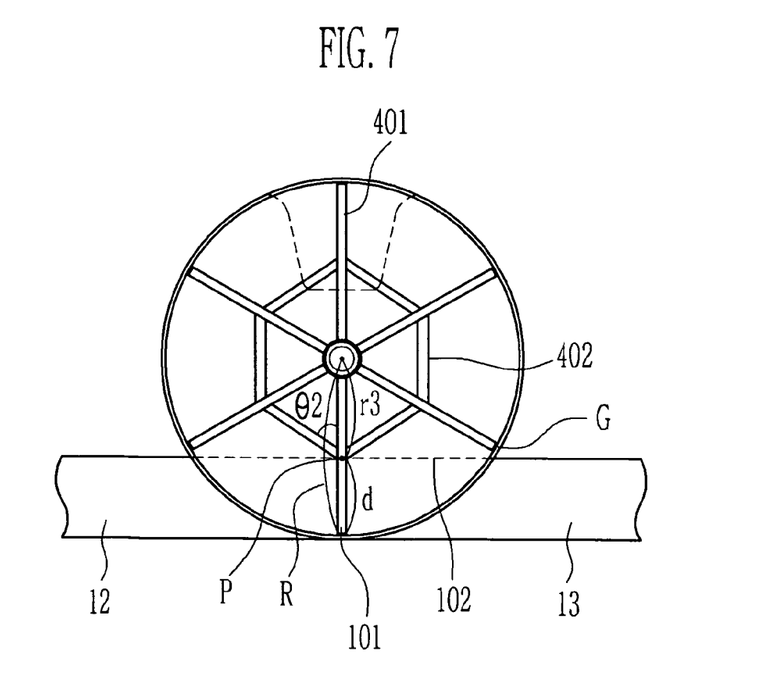
FIG. 7 is a sectional view of a flow meter employing A-type wings according to an embodiment of the present invention.

Referring to FIG. 7, a rectangular plate-shaped rim 402 is formed to extend between one side of a basic wing to one side of another basic wing. These types of wings are referred to as A-type wings 401. Here, a lateral edge of the rectangular plate-shaped rim 402 is parallel with the lateral edge of the basic wing, and the lateral edge of the rectangular plate-shaped rim has the same length as that of the lateral edge of the basic wing. Each of the rectangular plate-shaped rims formed to extend between two of the basic wings is referred to as an A-type auxiliary rim 402.

Hereinafter, embodiments of the shape of the wings will be described in detail with reference to FIGS. 4 to 7.

FIG. 4 is an embodiment of the shape of the rectangular plate-shaped wings, which is the shape of the basic wings. FIGS. 5 to 7 are embodiments of the shape of wings having auxiliary rims formed between the wings so as to minimize the distribution of a fluid passing through the volume flow meter between the rectangular plate-shaped wings of FIG. 4.

The wings 17 of FIG. 4 are radially arranged at an equal interval from the rotating shaft 16 with an equal angle. The number of wings is six, and each of the wings forms an angle of 60 degrees with respect to an adjacent wing. If a plurality of wings is radially arranged at an equal interval with an equal angle, embodiments of rectangular plate-shaped wings may include various numbers of wings.

FIG. 5 illustrates cylindrical wings 201. Each of the cylindrical wings 201 has an arc-shaped auxiliary rim 202. Here, the length of the lateral edge of the arc-shaped auxiliary rim 202 is substantially the same as that of the lateral edge of the basic wing, and has a circular radius smaller than the rotational radius R by the intercepting distance d. The arc-shaped auxiliary rims 202 forming a cylindrical rim as a whole are formed in a cylindrical shape between the basic wings. When the number of basic wings is six, the number of auxiliary rims is also six.

Specifically, the non-intercepting radius $r1$ is smaller than or equal to the value obtained by subtracting the intercepting distance d from the rotational radius R, which is expressed by the following Equation (1).

$$r1 \leq R - d \quad (1)$$

In Equation (1), it is preferable that $r1 = R - d$.

The cylindrical wings 201 are formed so that a gaseous fluid passing through the first and second openings 12 and 13 directly applies a force to the wings 17 without distribution. When comparing the cylindrical wing 201 with the triangular wing 301 of FIG. 6 and the A-type wing 401 of FIG. 7, it is easy to determine the rotational center of a rotating member because the auxiliary rims 202 are formed in a cylindrical shape.

Referring to FIG. 6, the triangular wing 301 has a rectangular plate-shaped rim 302 formed to extend between one side of one wing and one side of another adjacent wing. Here, the lateral edge of the rectangular plate-shaped rim 302 has the same length as the lateral edge of the basic wing. Referring to FIG. 6, an enclosed space by an auxiliary rim and two wings connected by the auxiliary wings form a triangle.

In the triangular wing 301, the line formed along a lateral edge of an auxiliary rim 302, which meets a side of a wing is referred to as a contact line (not shown). The contact line is parallel with the center line CL. A distance r2 from the center line CL to the contact line is smaller than or equal to the value obtained by subtracting the intercepting distance d from the rotational radius R, which is expressed by the following equation (2).

$$r2 \leq R-d \tag{2}$$

In Equation (2), it is preferable that r2=R−d.

Equation (2) can be represented by angle θ1, which is an angle defined between an auxiliary rim 302 and a wing at the contact line. In the triangular wing 301, the angle θ1 satisfies the following Equation (3).

$$90° \leq \theta 1 \leq 120° \tag{3}$$

In Equation (3), it is preferable that θ1=90 degrees.

The auxiliary rim 302 extended as described above are formed so that a gaseous fluid passing through the first and second openings 12 and 13 directly applies a force to the wings 17 without distribution. When comparing the triangular wing 301 with the cylindrical wing of FIG. 5 and the A-type wing 401 of FIG. 7, the triangular wing 301 enables the distribution of a fluid to be minimized.

Referring to FIG. 7, the A-type wing 401 has an A-type auxiliary rim 402 formed to extend between one side of a basic wings and one side of another basic wing. The A-type auxiliary rim 402 is formed in a rectangular plate shape, and the lateral edge of the A-type auxiliary rim 402 has the same length as the lateral edge of the basic wing. Referring to FIG. 7, it can be seen that the arrangement of an auxiliary rim and two wings resembles a shape of a character 'A'.

In the A-type wing 401, the line formed along a lateral edge of an auxiliary rim 402, which meets a side of a wing is referred to as a contact line (not shown). The contact line is parallel with the center line CL. A distance r3 from the contact line to the center line CL is smaller than or equal to the value obtained by subtracting the intercepting distance d from the rotational radius R, which is expressed by the following Equation (4).

$$r3 \leq R-d \tag{4}$$

In Equation (4), it is preferable that r3=R−d.

An angle formed between an auxiliary rim 402 and a wing at the contact line is referred to an angle θ2. The angle formed between the auxiliary rim 402 and a wing on the left is the same as an angle formed between the auxiliary rim 402 and another wing on the right. This is because the auxiliary rim 402 is formed at the same position of the sides of the left and right basic wings. The angle θ2 is ½ of the value obtained by subtracting an angle made by the left and right basic wings (i.e., an angle made by the basic wings) from 180.

In this embodiment of A-type of wings 401, the number of wings is six, and the angle made between two basic wings is 60 degrees. Therefore, the angle made between the auxiliary rim 402 and the basic wing is 60 degrees.

The auxiliary rim 402 extended as described above are formed so that a gaseous fluid passing through the first and second openings 12 and 13 directly applies a force to the wings 17 without distribution. When comparing the A-type wing 401 with the cylindrical wing 201 of FIG. 5 and the triangular wing 301 of FIG. 6, wings can be easily manufactured.

It has been already described that a line parallel with the center line, which is formed when the aforementioned auxiliary rim 202, 302 or 402 meets the basic wing 101 is referred to as a contact line. Based on the aforementioned descriptions, it is preferable that r1=r2=r3.

Figure 8A:
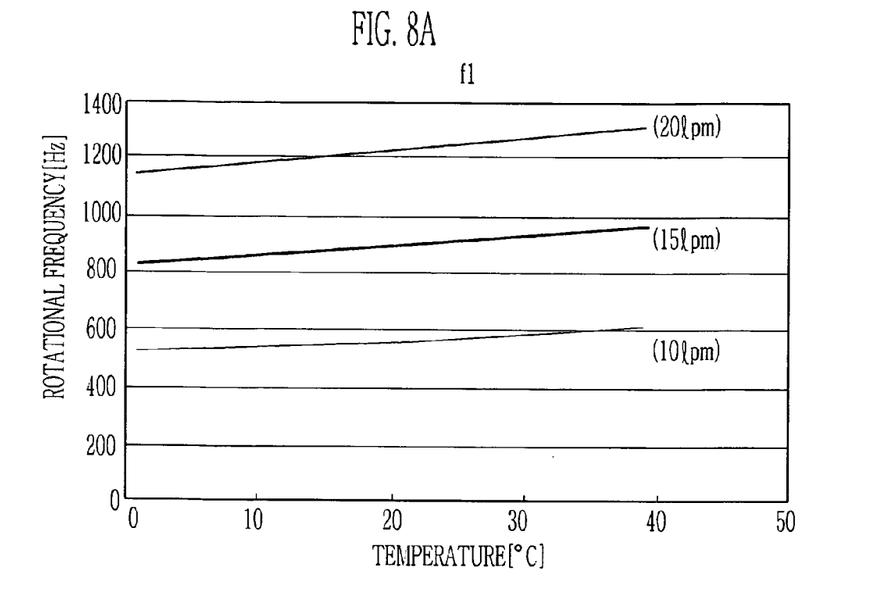
FIG. 8A is a graph illustrating average rotational frequencies of an f1 flow meter, measured in accordance with temperature-flow variations.
Figure 8B:
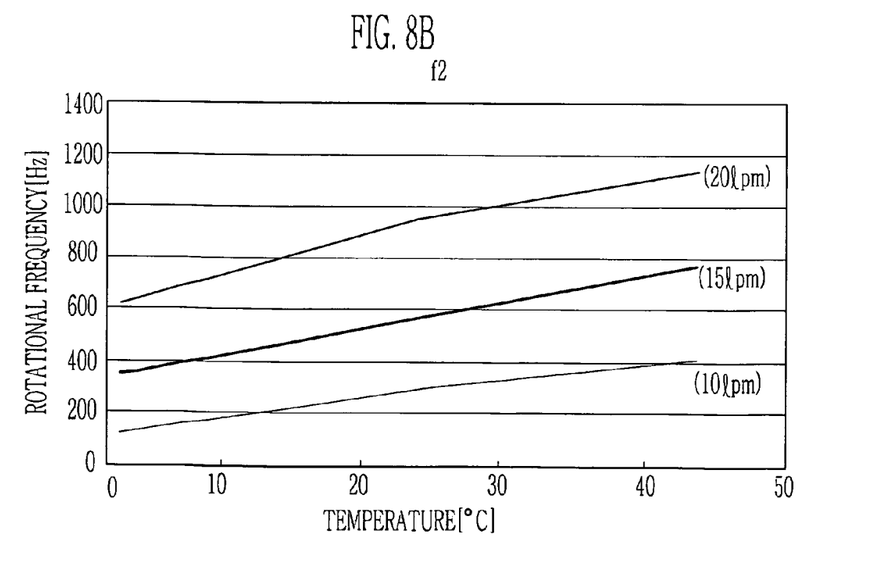
FIG. 8B is a graph illustrating average rotational frequencies of an f2 flow meter, measured in accordance with temperature-flow variations.

FIGS. 8A and 8B are graphs representing data shown in the following Table 1, in which average rotational frequencies are measured in accordance with temperature-flow variations.

The following Table 1 shows numerical values of average frequency data obtained by measuring rotational frequencies of a volume flow meter (hereinafter, referred to as a flow meter f1) having one bearing and a volume flow meter (hereinafter, referred to as a flow meter f2) having two bearings in accordance with temperature-flow variations. The rotational frequencies of a volume flow meter are represented as frequencies (Hz) of wings.

As illustrated in FIGS. 8A and 8B, the flow meter f1 includes one bearing 18 installed at the center of the rotating shaft 16, and the flow meter f2 includes two bearings installed at the rotating shaft 16.

The flow meters f1 and f2 are provided in the vicinity of the inlet of the air pump, and the temperature is an average temperature in the vicinity of the inlet. The flow meters f1 and f2 are implemented at temperatures of average 0.8° C., 19.9° C. and 39.2° C. The flows flowed into the flow meters f1 and f2 are 10 LPM, 15 LPM and 20 LPM.

TABLE 1

| Temperature | f1 (Hz) | | | f2 (Hz) | | |
| --- | --- | --- | --- | --- | --- | --- |
| | 10 LPM | 15 LPM | 20 LPM | 10 LPM | 15 LPM | 20 LPM |
| 0.8° C. | 519.1 | 822.2 | 1144.5 | 116.4 | 339.9 | 624.1 |
| 19.9° C. | 554.2 | 891.8 | 1234.8 | 284.8 | 561.6 | 951.1 |
| 39.2° C. | 603.2 | 968.2 | 1312.2 | 409.4 | 771.3 | 1147.1 |

Referring to Table 1 and FIGS. 8A and 8B, it can be seen that in the flow meter f1, which includes one bearing 18, the volume of air is increased due to the increase in temperature, but the rotational frequencies are not affected. In other words, it can be seen that the flow meter f1 has an error range narrower than that of the flow meter f2 in accordance with temperature variations.

Figure 9:
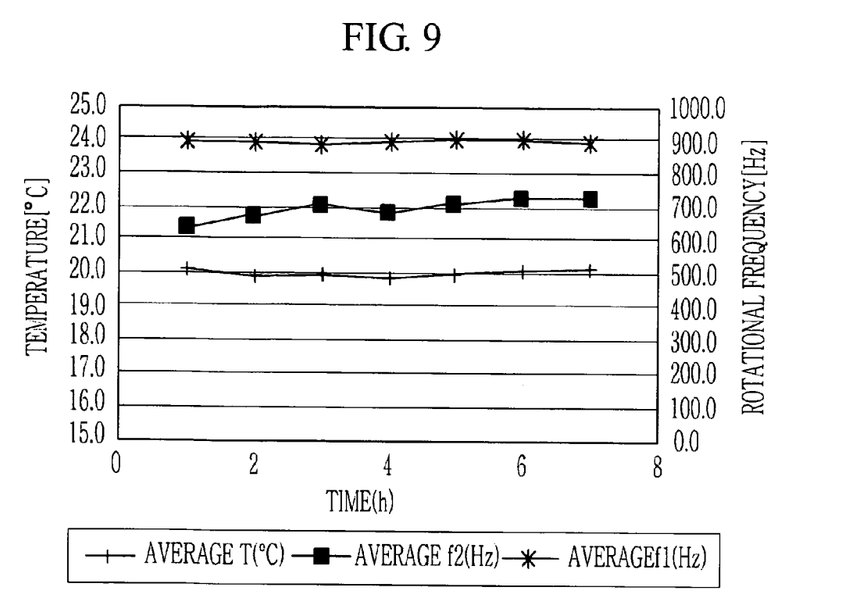
FIG. 9 is a comparative graph illustrating repetitive natures of the f1 and f2 flow meters.

FIG. 9 is a graph illustrating data shown in the following Table 2, in which repetitive natures of the flow meters f1 and f2 are compared with each other.

The following Table 2 shows frequency data obtained by comparing repetitive natures of the flow meters f1 and f2. The rotational frequencies of the flow meters f1 and f2 are measured every one hour by setting the temperature of the inlet of the air pump as average 20 and maintaining the flow flowed into the flow meters f1 and f2 as 15 LPM.

TABLE 2

| Section | 1 | 2 | 3 | 4 | 5 | 6 | 7 |
|---|---|---|---|---|---|---|---|
| f1 (Hz) | 888.3 | 888.1 | 883.9 | 891.8 | 903.3 | 909.2 | 895.4 |
| f2 (Hz) | 663.7 | 671.0 | 701.5 | 678.2 | 711.4 | 723.9 | 726.1 |

In Table 2, '1' denotes 0 to 1 hour, '2' denotes 2 to 3 hours, '3' denotes 4 to 5 hours, '4' denotes 17 to 18 hours, '5' denotes 19 to 20 hours, '6' denotes 22 to 23 hours, and '7' denotes 24 to 25 hours.

Referring to Table 2 and FIG. 9, it can be seen that the flow meter f1 has an error range narrower than that of the flow meter f2, and its error range is ±0.3 LPM from the average value.

According to the aforementioned embodiments, the present invention has the following characteristics and advantages.

First, the diameter of the first and second openings 12 and 13 in the flow meter 4 was controlled. The first and second openings 12 and 13 were arranged in a straight line, thereby reducing errors caused by the increase of the pressure of a fluid. The flow path from the inlet to outlet of the oxidizer supply device 3 was disposed in a straight line.

Second, the flow meter 4 was provided in the vicinity of the inlet of the oxidizer supply device 3 to have no influence caused by a change in pressure in the stack 1 or the fuel supply device 2.

Third, a highly functional plastic was used as the material of the flow meter 4 so that the flow meter 4 was little influenced by external environmental factors.

Fourth, the rotating member 15 was formed using a material with a small weight, thereby reducing errors caused by the inertial force.

Fifth, rotational frequencies were exactly measured using the photo sensor 19, thereby reducing an error range.

Sixth, the shape of the wing 17 in the rotating member 15 was implemented in various forms, thereby minimizing the error range caused by the distribution of a fluid.

Seventh, the rotating member 15 different from one used in typical flow meters was used by employing the bearing 18 used in the rotating shaft and the fixed shaft 14. Accordingly, the error range caused by the weight of the bearing 18 was reduced. In addition, it was verified through experiments and structural modifications that the flow meter having one bearing 18 had an error range narrower than that of the flow meter having two bearings.

Eighth, the supply of a large flow of fluid results in a turbulent flow that is an irregular flow. Accordingly, the error range of flows measured is increased due to the turbulent flow. To solve such a problem, a constant flow corresponding to 10 to 200 IPPM was supplied to the opening of the flow meter 4, diameter of which is 2.0 to 20.0 mm, thereby reducing the error range.

Ninth, the desired amount of oxygen irregularly contained in the air was precisely supplied by employing the temperature measuring device 6, the pressure measuring device 7 and the oxygen concentration measuring device 8.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A fuel cell system comprising:
    a stack for generating electricity by an electrochemical reaction of a fuel and an oxidizer;
    an oxidizer supply device for supplying an oxidizer to the stack; and
    a volume flow meter coupled to the oxidizer supply device, the oxidizer flowing through the oxidizer supply device and the volume flow meter before being supplied to the stack, the volume flow meter measuring a volume flow of the oxidizer, the volume flow meter being driven by power supplied from the oxidizer supply device.

2. The fuel cell system according to claim 1, wherein the volume flow meter includes an impeller.

3. The fuel cell system according to claim 1, wherein the volume flow meter comprises:
    a body having an inner space and first and second openings connected to the inner space;
    a fixed shaft disposed in the inner space, an end of the fixed shaft being fixedly coupled to an inner groove formed on the body;
    a rotating member disposed in the inner space, the rotating member comprising:
        a rotating shaft rotatably coupled to the fixed shaft; and
        a plurality of plate-shaped wings connected to the rotating shaft;
    a bearing for coupling the fixed shaft to the rotating shaft; and
    a sensor for measuring a rotational frequency of the rotating member.

4. The fuel cell system according to claim 3, wherein the bearing is positioned around a center of mass of the rotating member.

5. The fuel cell system according to claim 3, wherein the rotating member further comprised an auxiliary rim arranged between two of the plate-shaped wings, a length of a lateral edge of the auxiliary rim being substantially the same as a length of a lateral edge of the plate-shaped wings, the lateral edge of the auxiliary rim being parallel with the lateral edges of the plate-shaped wings.

6. The fuel cell system according to claim 5, wherein a cross-section of the auxiliary rim is formed in an arc shape.

7. The fuel cell system according to claim 5, wherein the auxiliary rim is formed in a plate shape, and connects an end lateral edge of one of the plate-shaped wings to a side of another of the plate-shaped wings.

8. The fuel cell system according to claim 5, wherein the auxiliary rim is formed in a plate shape, and connects a side of one of the plate-shaped wings to a side of another of the plate-shaped wings.

9. The fuel cell system according to claim 3, wherein the first and second openings are arranged along a straight line.

10. The fuel cell system according to claim 3, wherein a diameter of each of the first and second openings is about 2.0 mm to about 20.0 mm.

11. The fuel cell system according to claim 10, wherein a rating capacity of the volume flow meter is about 10 LPM to about 200 LPM.

12. The fuel cell system according to claim 3, wherein the sensor includes a photo sensor.

13. The fuel cell system according to claim 12, wherein the photo sensor includes a transmission-type photo sensor.

14. The fuel cell system according to claim 1, wherein the volume flow meter is coupled to an inlet of the oxidizer supply device, through which the oxidizer flows into the oxidizer supply device.

15. The fuel cell system according to claim 1, further comprising a temperature measuring device coupled to the inlet of the oxidizer supply device.

16. The fuel cell system according to claim 1, further comprising a pressure measuring device coupled to the inlet of the oxidizer supply device.

17. The fuel cell system according to claim 1, further comprising an oxygen concentration measuring device coupled to the inlet of the oxidizer supply device, the oxygen concentration measuring device measuring the concentration of oxygen contained in air.

18. The fuel cell system according to claim 1, further comprising:
   a temperature measuring device, a pressure measuring device and an oxygen concentration measuring device, sequentially coupled to the inlet of the oxidizer supply device; and
   a controller for controlling operations of the oxidizer supply device based on information sent from the stack, the fuel supply device, the volume flow meter, the temperature measuring device, the pressure measuring device and the oxygen concentration measuring device.

19. The fuel cell system according to claim 1, further comprising:
   a fuel supply device for supplying a fuel to the stack;
   a second oxidizer supply device for supplying an oxidizer to the fuel supply device; and
   a second volume flow meter coupled to the second oxidizer supply device, the second volume flow meter measuring a volume flow of the oxidizer supplied to the fuel supply device.

* * * * *